Patented July 12, 1927.

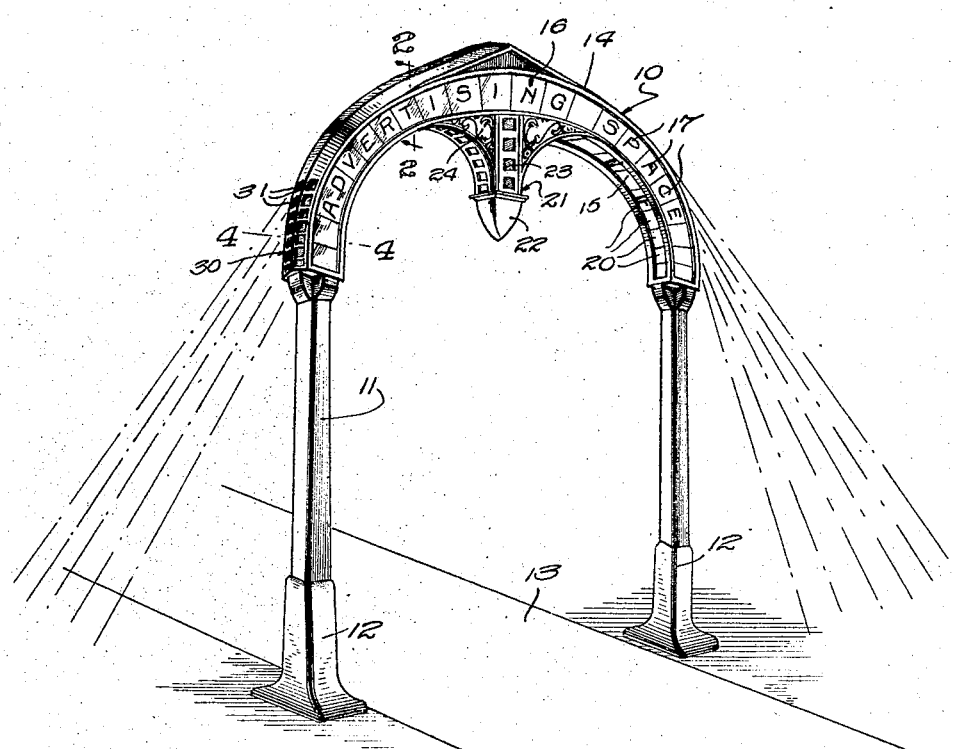

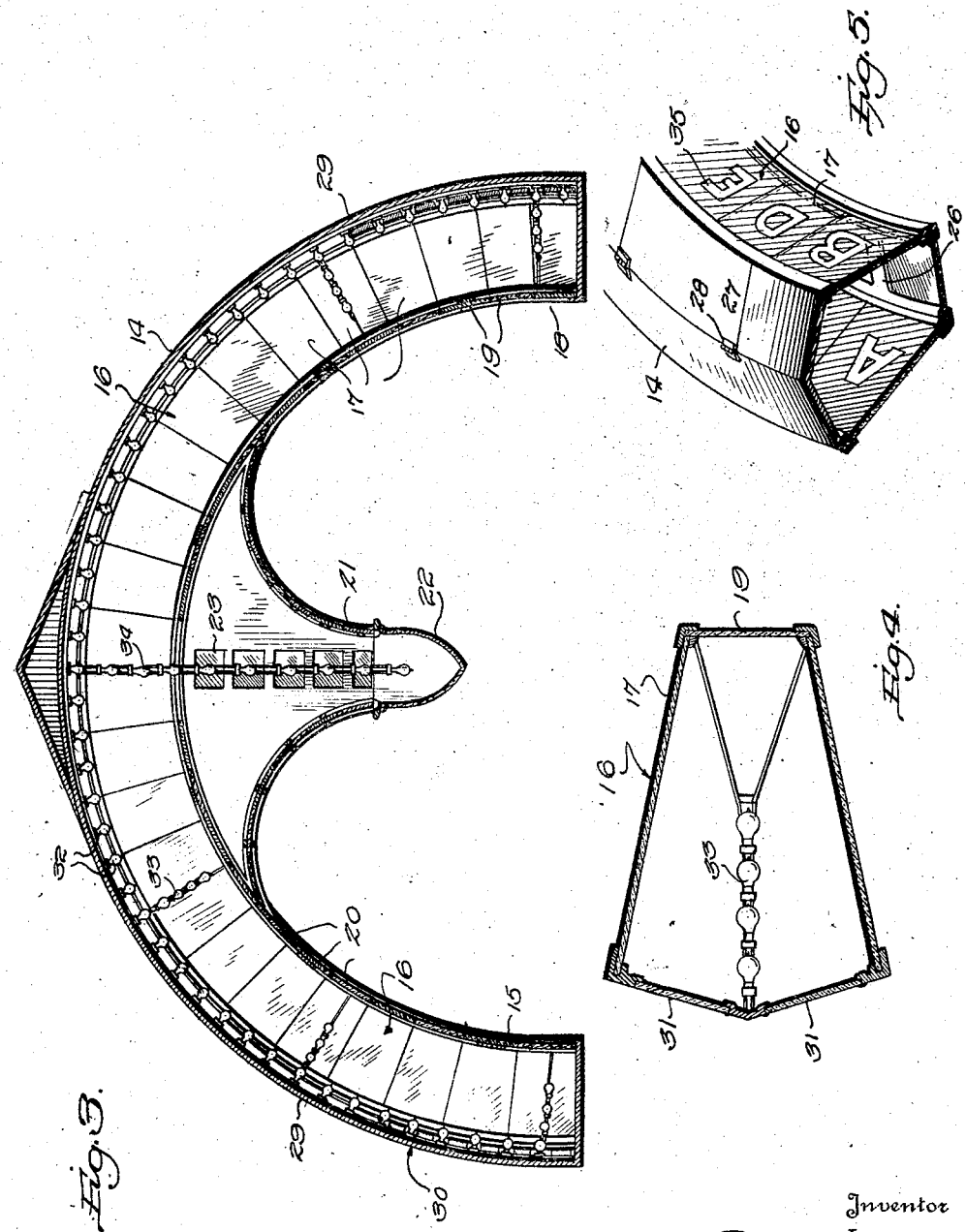

1,635,611

UNITED STATES PATENT OFFICE.

RAOUL DE LA LAMA, OF MEXICO, MEXICO.

HIGHWAY LIGHTING SYSTEM AND APPARATUS THEREFOR.

Application filed September 22, 1926. Serial No. 137,130.

This invention relates to highway lighting systems and apparatus therefor.

An important object of the invention is to provide a novel system for lighting highways whereby a broad band of light covering substantially the entire width of the road is projected in opposite directions for a material distance to efficiently illuminate the highway, as distinguished from the usual system of employing a single light source approximating a point arranged at the side of the highway.

A further object is to provide a system of the character referred to wherein the light source extends throughout the width of the highway and includes a plurality of lighting units adapted to project relatively broad beams of light in opposite directions for a substantial distance along the highway, each beam comprising diverging rays, the lower of which strike the highway relatively close to the light source while the upper rays are projected along the highway for a substantial distance.

A further object is to provide a system of the character just outlined wherein the light source as a whole includes transparent or translucent light transmitting media behind which the lighting units are evenly arranged in such a manner that the greater portion of the light rays are projected downwardly toward the highway.

A further object is to provide novel apparatus for illuminating highways and the like wherein the lighting structure is arranged a substantial distance above and spans or arches the highway, the lighting structure being provided throughout its length transversely of the highway with a plurality of light sources adapted to project beams of diverging rays in opposite directions downwardly to illuminate the highway from points adjacent the lighting structure to points remote therefrom.

A further object is to provide an apparatus of the character above referred to wherein the lighting structure which spans the highway is provided with end portions adjacent the sides of the highway, which are adapted to transmit portions of the light from the light sources outwardly transversely of the highway and downwardly to illuminate sidewalks or the like arranged adjacent and parallel to the highway.

A further object is to provide a novel form of ornamental lighting structure of the character referred to wherein the light transmitting media are in the form of individual sections of glass or the like which are adapted to be readily inserted in position.

A further object is to provide a lighting structure of the character above mentioned wherein certain of the light media are adapted to bear letters or other symbols of any desired character without materially interfering with the illuminating efficiency of the apparatus.

Other objects and advantages of the invention will become apparent during the course of the following description.

In the drawings I have shown one assembly of apparatus elements. In this showing:

Figure 1 is a perspective view of the apparatus,

Figure 2 is a section on line 2—2 of Figure 1,

Figure 3 is a central vertical sectional view taken throughout the length of the lighting apparatus detached from its supporting means, Figure 4 is a section on line 4—4 of Figure 1, and, Figure 5 is a fragmentary sectional perspective view taken through a portion of the lighting apparatus.

Referring to Figure 1, the numeral 10 designates the lighting apparatus as a whole which may be supported upon posts or standards 11 arranged on pedestals 12. The apparatus as a whole is arranged to span a highway 13 with the pedestals 12 arranged adjacent opposite edges thereof. It will be apparent however, that the arrangement of the apparatus as a whole need not be restricted to the placing of the elements as shown, but that the lighting apparatus 10 may be of any suitable length and that the pedestals 12 may be placed in any desired position with respect to the highway.

The lighting apparatus 10 is shown in the present embodiment of the invention as an archway 14. The archway is shown in section in Figure 2 of the drawings and includes upper and lower guides 15 arranged at the sides thereof to receive light transmitting media 16 preferably comprising a plurality of glass sections 17. The glass sections are slidable in the guideways in order that they may be assembled as shown. The light transmitting media at opposite sides of the archway are preferably inclined downwardly and inwardly toward each other, as shown in Figure 2. The guideways 15 are also provided with inwardly projecting portions 18 forming guideways for inner and lower transmitting media 19 also preferably formed of a plurality of glass sections 20. The central portion of the archway is provided with a downwardly projecting portion 21, and the light transmitting media 20 preferably extend to the lower portion of the downwardly projecting portion 21, the latter preferably being provided with an ornamental finishing cap 22. Opposite sides of the depending or downwardly projecting portion 21 also are preferably provided with light transmitting media 23. If desired, the upper portion of the projection 21 may be suitably ornamented as indicated at 24.

Referring to Figures 2 and 3 of the drawings, the numeral 25 designates a cover for the lighting apparatus which is secured at opposite edges to the upper guideways 15. It will be apparent that the cover 25 secures the guideways in their proper positions, while the inwardly projecting portions 18 of the lower guideways 15 may be provided at spaced intervals with transverse braces 26. At any desired points, the top 25 may be provided with doors 27 forming substantial continuations of the cover and hinged thereto as at 28. These doors provide access to the interior of the archway to render the lighting units to be described readily accessible. The top 25 is substantially solid throughout the greater portion of its length, but terminates at opposite sides above the lower extremity of the archway as indicated at 29. The inner surfaces of the cover 25 and doors 27 are preferably polished to provide a reflecting surface. Below the extremities 29, the archway is provided with outer light transmitting media 30 also comprising a plurality of glass sections 31. It will be noted that the cover 25 is bent in a line substantially centrally thereof and extending throughout its length whereby the inner reflecting surfaces thereof are formed substantially as conic sections.

Suitable lighting units are arranged within the archway as shown in Figure 3. A plurality of lighting units 32 are preferably arranged throughout the length of the arch and secured against the central portion of the top or cover 25. These light sources are augmented at intervals by a plurality of light sources 33 which extend inwardly substantially radially of the archway, while adjacent the center of the archway further lighting units 34 are provided the lower of which extend downwardly into the projection 21. The light sources 33 above the extremities 29 of the top 25 preferably terminate above the centers of the light transmitting media 16 whereby it will be apparent that the great majority of lighting units are arranged in the upper portion of the archway.

In Figures 1 and 5 of the drawings the light transmitting media 16 have been shown as being provided with letters or other characters 35. These letters or the like may be employed for any desired purpose such as for indicating the name of the highway, for advertising purposes, or the like. The light transmitting media may be formed of any suitable material, but glass is preferably provided for this purpose and the body of the glass and the letters 35 may be suitably distinguished from each other in any desired manner by making the different portions of the glass translucent and opalescent respectively. The difference between the body of the section 17 and the letters obviously is merely a suggested one, and it will be apparent that the portions of the glass sections may be distinguished from each other in any suitable manner, it being understood that the material as employed is of such a character as to permit the transmission therethrough of a considerable portion of the light rays from the light sources.

The operation of the apparatus is as follows:

The provision of the light sources extending throughout the length of the lighting apparatus, that is throughout the width of the highway, and the use of the transmitting media 16 provides a beam of light which is at least coextensive with the width of the road as distinguished from the usual practice of employing a plurality of single lamp posts each using a source of illumination which approximates a point from which light is radiated in all directions. The majority of the lighting units are arranged above the median line of the light transmitting members whereby it will be apparent that the beams comprise light rays, the majority of which will be cast downwardly toward the road. These rays will of course diverge so that light will be cast upon the highway from points in proximity to the lighting apparatus to points along the highway remote therefrom. The use of the reflecting surfaces within the cover 25 and doors 27 serves to utilize a great portion of the light rays which are projected upwardly and these light rays are reflected downwardly toward the highway as indicated in Figure 2. The reflecting surfaces serve to greatly increase the efficiency of the apparatus as a whole. These reflecting surfaces also intercept rays of light which are projected upwardly from the light sources arranged beneath the extremities 29 of the cover, and these upwardly projected rays also will be redirected to some portion of the roadway. In order to furnish a considerable portion of light directly beneath the archway, the light transmitting media 19 are employed, and direct light from the lighting sources will pass therethrough. In order to illuminate adjacent portions of sidewalks and the like I provide the light transmitting media 30 and it will be apparent that a considerable portion of light will be cast upon such sidewalks through the glass sections 31, at points adjacent the lighting apparatus, while sufficient light will diverge outwardly from the highway lighting beams to light distant or remote points along the sidewalks. The characters 35 may be employed for any desired purpose, as previously stated. It is to be understood, however, that the light transmitting media 16 is of such a character as to transmit the greater portion of the light rays projected thereto. The projection 21 is provided partly for purposes of ornamentation and partly for the purpose of increasing the illumination. A portion of the light from some of the sources 32 as well as light from the sources 34 will be projected through the glasses 23 to assist in illuminating the roadway, while the inner light transmitting media 19 will serve to illuminate the width of the highway adjacent the lighting apparatus.

From the foregoing it will be apparent that the apparatus described provides a system of illuminating highways and the like wherein a relatively broad beam of light extending substantially across the entire width of the roadway is controlled in such a manner as to project diverging rays the majority of which will be cast downwardly to illuminate the highway from points adjacent the lighting apparatus to points remote therefrom.

The structural elements of the apparatus are adapted to be readily assembled. In practice, the lower ends of the casing are preferably closed by removable plates to provide access to the interior of the casing and to the guideways 15 whereby the glass plates may be successively introduced into the guideways and moved to their proper positions. The interior of the casing is readily accessible through the doors 27 which are arranged sufficiently close together to permit any of the lighting units to be reached whereby they may be replaced in the usual manner.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Apparatus of the character described comprising a casing adapted to be arranged above a highway transversely thereof, light transmitting media arranged at the sides of said casing, light transmitting media arranged at the end portions of said casing substantially above the edges of the highway to transmit light outwardly thereof substantially at right angles thereto, and a plurality of lighting units arranged in said casing, the majority of said units being arranged above a line through the centers of said first named light transmitting media.

2. Apparatus of the character described comprising a casing adapted to be arranged above a highway transversely thereof and provided with a cover portion having polished inner surfaces, a plurality of light transmitting members arranged at opposite sides of said casing, a plurality of lighting units arranged in said casing, the majority of said lighting units being arranged above a line through the centers of said light transmitting members, said casing being further provided with light transmitting members arranged adjacent its end portions and substantially vertically arranged.

3. Apparatus of the character described comprising a casing formed substantially as an archway adapted to be arranged above a highway transversely thereof, light transmitting members arranged at opposite sides of said casing and converging toward each other inwardly substantially radially of said casing, and a plurality of lighting units arranged in said casing, the majority of said lighting units being arranged outwardly of the median lines of said light transmitting members.

4. Apparatus of the character described comprising a casing formed substantially as an archway adapted to be arranged above a highway transversely thereof, light transmitting members arranged at opposite sides of said casing and converging toward each other inwardly substantially radially of said casing, a plurality of lighting units arranged in said casing, the majority of said lighting units being arranged outwardly of the median lines of said light transmitting members, the outer face of said casing adjacent its end portions being provided with light transmitting media.

5. Apparatus of the character described comprising an arcuate casing arranged with its ends substantially in a common horizontal plane, said casing being adapted to be arranged above a highway transversely thereof, said casing including a top having reflecting inner surfaces and terminating at points above the ends of said casing, a plurality of light transmitting plates arranged at opposite sides of said casing, light transmitting means forming closures for the outer face of said casing below the extremities of said top, and a plurality of lighting units in said casing, the majority of said lighting units being arranged outwardly of the median lines of said light transmitting plates.

6. An apparatus constructed in accordance with claim 5 wherein the inner face of said casing substantially throughout its length comprises a plurality of light transmitting media.

7. Apparatus of the character described comprising a casing adapted to be arranged above a highway transversely thereof, light transmitting media forming closures for the sides and bottom of said casing, a top carried by said casing and bent to form angularly arranged inner faces, said faces being polished to form reflecting surfaces, and a plurality of lighting units arranged in said casing.

8. Apparatus of the character described comprising an arcuate casing terminating at its ends in downwardly projecting leg portions having their extremities arranged in a common horizontal plane, light transmitting members forming closures for the sides of said casing, light transmitting means forming closures for the outer faces of the downwardly projecting leg portions of said casing, a top for said casing terminating at its ends adjacent the upper ends of said light transmitting means, and a plurality of lighting units arranged in said casing, the majority of said units being arranged outwardly of the median lines of said light transmitting members.

9. An apparatus constructed in accordance with claim 8 wherein said top is bent to form a pair of conic sections having their inner faces polished to form reflecting surfaces.

In testimony whereof I affix my signature.

RAOUL DE LA LAMA.